United States Patent

[11] 3,592,145

| [72] | Inventor | Gene A. Petry<br>New Carlisle, Ohio |
|---|---|---|
| [21] | Appl. No. | 850,503 |
| [22] | Filed | Aug. 15, 1969 |
| [45] | Patented | July 13, 1971 |
| [73] | Assignee | The United States of America as represented by the Secretary of the Air Force |

[54] FORCE-CARRYING INTERLOCK FOR ALUMINUM EXTRUDED PLATFORM
3 Claims, 9 Drawing Figs.

| [52] | U.S. Cl. | 108/51 |
|---|---|---|
| [51] | Int. Cl. | B65d 19/00 |
| [50] | Field of Search | 108/51–58; 214/6.21; 280/43.17, 79.1 |

[56] References Cited
UNITED STATES PATENTS

| 2,647,287 | 8/1953 | Jones | 108/51 UX |
| 2,692,107 | 10/1954 | Riddor et al. | 108/51 |
| 2,858,774 | 11/1958 | Batten | 108/51 UX |
| 3,093,216 | 6/1963 | Dunham | 108/51 UX |
| 3,307,504 | 3/1967 | Cloyd et al. | 108/51 UX |

*Primary Examiner*—Paul R. Gilliam
*Attorneys*—Harry A. Herbert, Jr. and Charles H. Wagner ABSTRACT: An aircraft cargo delivery pallet comprising a plurality of elongated flat extruded lightweight metallic panels interlocked together along their longitudinal edges and having a plurality of spaced elongated metallic skid strips secured transversely across the bottom surfaces of the panels adjacent their interlocking edges in parallel relation to each other, holding the panels in substantially predetermined relative flat interlocking edge-to-edge relation and elongated side rails secured to the panels across the opposite ends thereof.

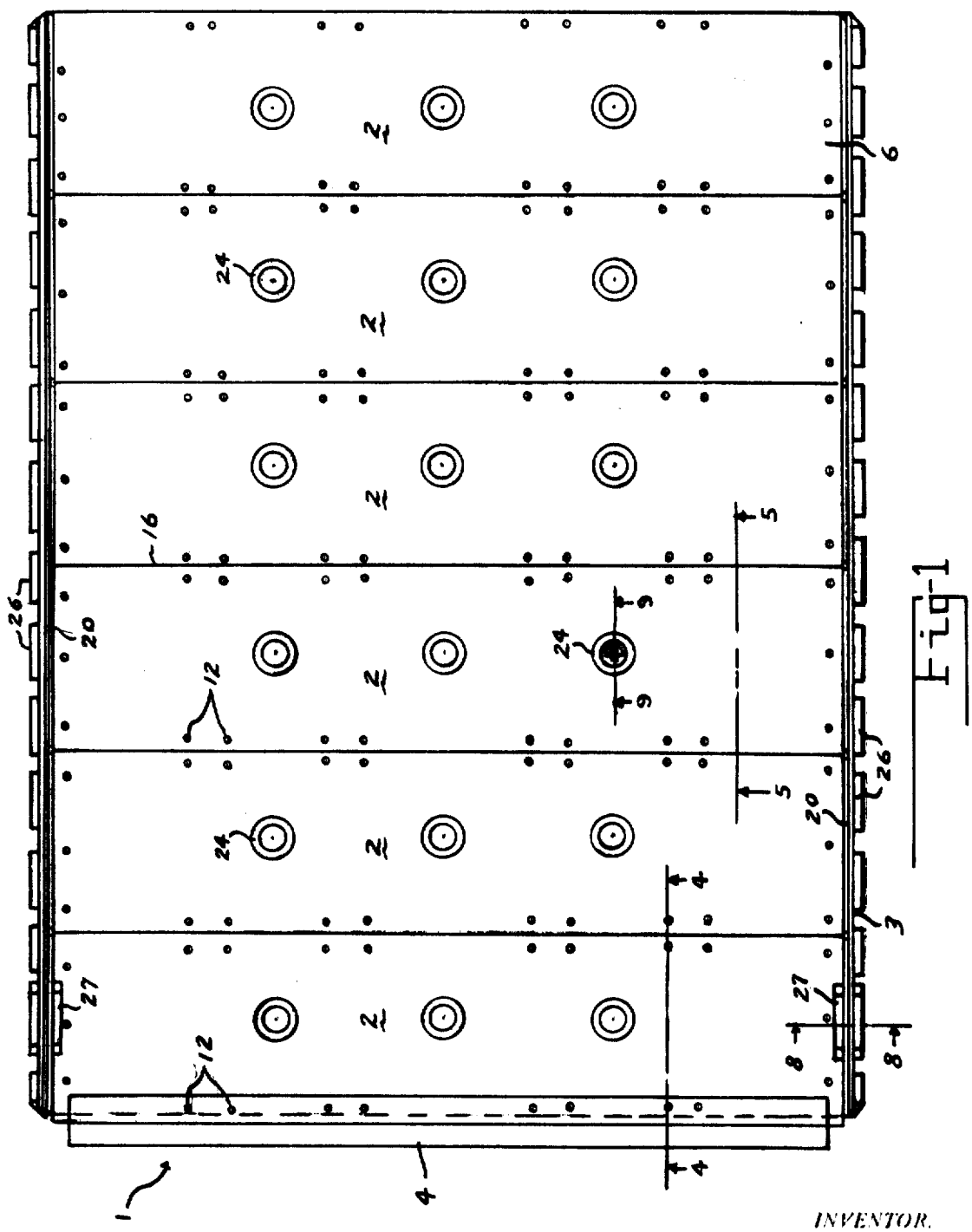

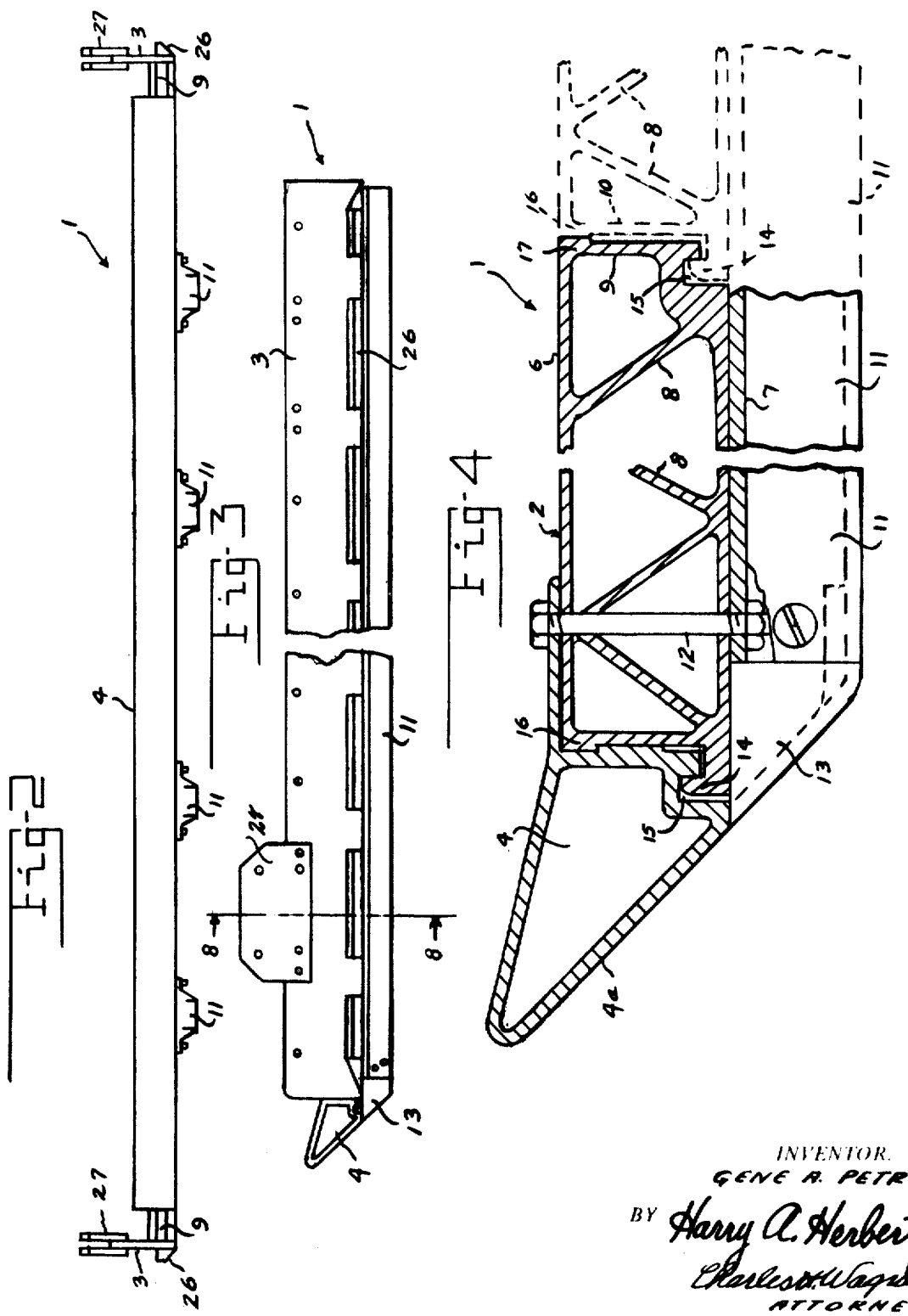

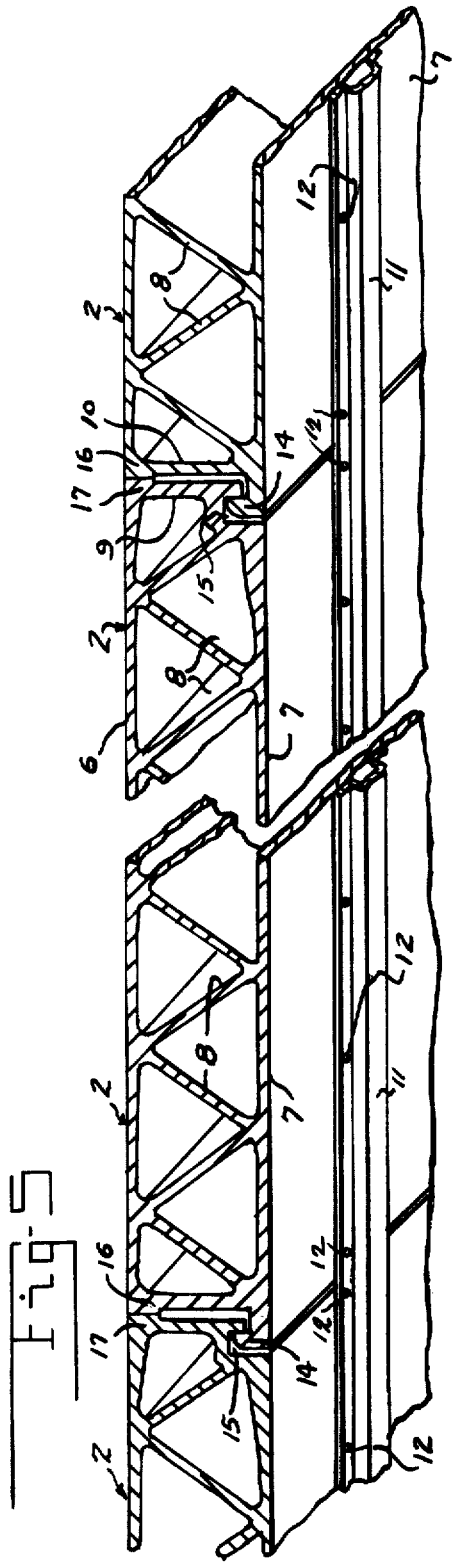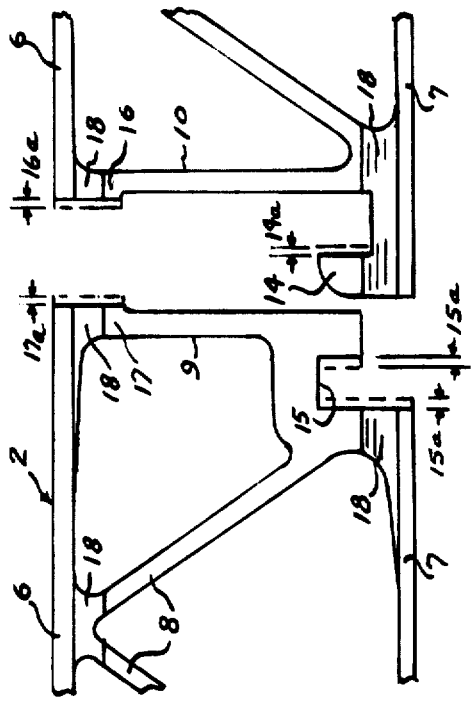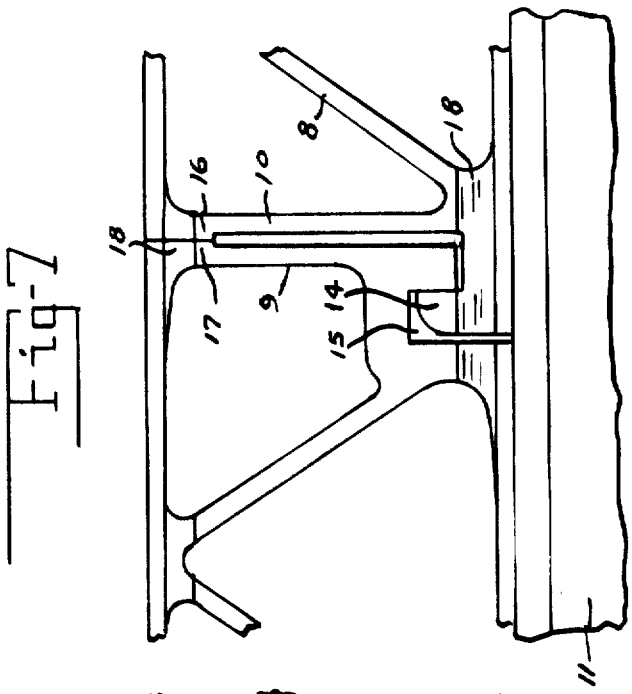

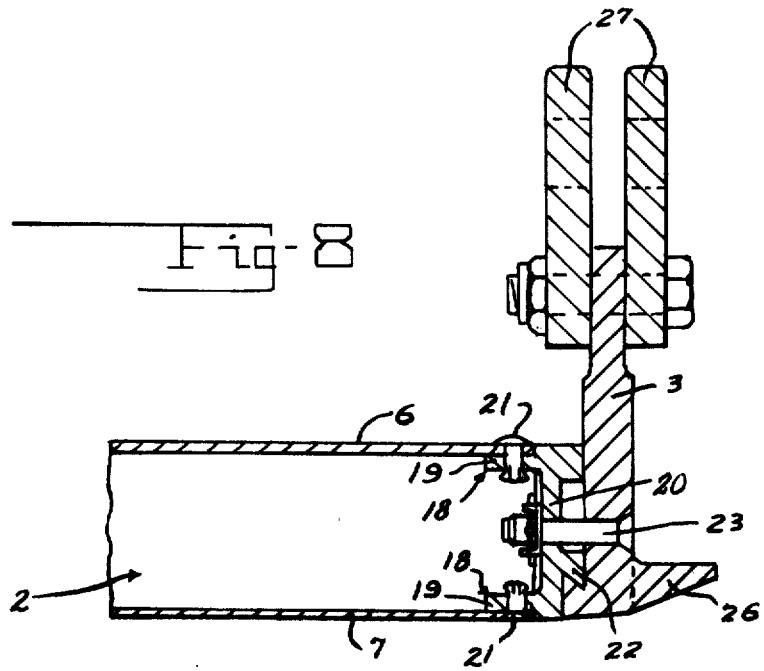
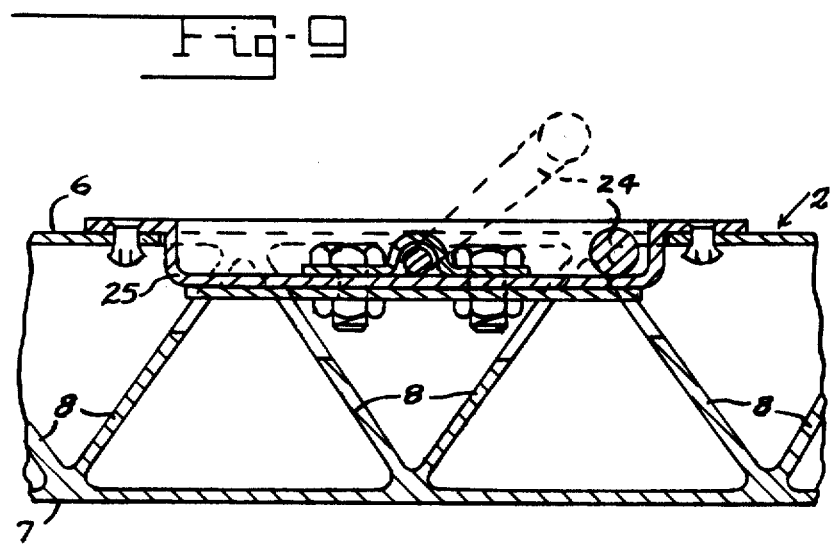

3,592,145

1

FORCE-CARRYING INTERLOCK FOR ALUMINUM EXTRUDED PLATFORM

BACKGROUND OF THE INVENTION

Existing methods of assembling pallet platforms together is to butt elongated panels together and attach side rails to the ends of the panels, forming the desired length of the pallets by adding more panels. For low-level aircraft delivery, skids are also attached to the undersurface of the platform to provide additional strength and a riding surface during the ground slide when dropped from a low-flying aircraft.

Although some platforms, or cargo pallets, have been fabricated in this manner, over 90 percent had only a one-time use, due to deformation of the skids and side rails following a low-level drop and skid, and primarily because they would be so deformed as to not then fit into the roller conveyors of the cargo delivery aircraft even though they appeared to be reusable.

An object of the invention is the provision of an assembly-type pallet comprising elongated extruded panels having interlocks along their abutting edges which take advantage of the bending strength of each panel without allowing the skids and side rails on the bottom and opposite ends of the panels to deform below the bending strength of the panels. This was achieved by recognizing the fact that all high adverse bending forces transmitted to the pallet or platform upon ground contact caused the platform to bend concave upward, and therefore only concave upward forces had to be accounted for.

The attached elongated side rails and skids provide more than sufficient strength to resist the concave forces during normal handling and the side and skid rails to prevent any slight relative vertical displacement between the panels, while the interlock means between the adjacent longitudinal edges of adjacent panels resist upward angular movement between the adjacent panels, relative to each other.

A further object is the provision of a pallet having extruded elongated panels each with complementary interengaging or interlocking means along their opposite edges, which are extruded with an internal truss formed with an excess thickness on the interengaging means so that a two-headed machining tool can easily be used, having fixed spaced cutting heads that allow economical simultaneous machining of both of the interlocking sides of the panel to thereby hold very close tolerances and provide for a high-volume production rate.

The interlocking design provides for the excess metal to be extruded on the basic panel extrusion and during the machining process this excess material is removed to a very close tolerance.

Prior to this invention, no lightweight cargo delivery pallets comprising an assembly of elongated panels was successfully reusable more than a few times, and drop loads therefore limited to 20,000 pounds or less.

With the extruded panels fabricated according to this invention and forming standard 24-foot platforms, cargo loads of 50,000 pounds have been successfully extruded and dropped from a low-flying cargo aircraft by extraction without a sustaining parachute, without appreciable damage or distortion, and were still in good and reusable condition for subsequent similar aircraft cargo free fall delivery drops.

BRIEF DESCRIPTION OF THE DRAWINGS

Like reference characters refer to like parts in the several figures of the drawings in which:

FIG. 1 is a top plan view of an assembled pallet made in accordance with the invention.

FIG. 2 is a front elevation view, slightly enlarged, of the pallet shown in FIG. 1.

FIG. 3 is a further enlarged fragmentary side elevation of the pallet shown in FIGS. 1 and 2, but broken away intermediate its ends to foreshorten the view.

FIG. 4 is a longitudinal, vertical, sectional view, taken about on the plane indicated by line 4—4 in FIG. 1, certain parts being broken away, and parts shown in dotted lines.

2

FIG. 5 is a fragmentary perspective view taken longitudinally of the pallet through several of the panels, showing the same held in their interlocking relation by one of the bottom skid rail members.

FIG. 6 is a considerably enlarged fragmentary end view of the adjacent edge portions of two extruded adjacent panels before the panels are interlocked but after the excess extruded material, shown in dotted lines, is removed from the interengaging complimental connecting vertical tongue-and-groove flanges thereof.

FIG. 7 is a fragmentary end view of the two panels shown in FIG. 6, but with the same connected and held in interlocking relation with the skid rail, after removal of the excess extruded material from the interlocking flanges, securing means between the skid rail and the panels being omitted.

FIG. 8 is an enlarged detail vertical sectional view taken about on line 8—8 in FIG. 1.

FIG. 9 is a vertical sectional view taken about on line 9—9 in FIG. 1, to illustrate one of the cargo "tiedown" rings, with the ring raised in dotted lines.

Referring to FIG. 1, the reference numeral 1 denotes a pallet generally, comprising a plurality of elongated extruded panels 2, side rails 3, a nose rail or plate 4, and a rear closure rail 5 mounted somewhat similar to the nose plate or rail 4.

The upper cargo-receiving surface of the pallet 1 is preferably flat and may be of any desired length and width, depending upon the number and size of panels that are employed. The rectangular elongated panels 2 are of extruded truss form, having the upper and lower surfaces 6 and 7, with intermediate inclined truss or web members 8 and parallel sidewalls 9 and 10, perpendicular to the top and bottom surfaces 6 and 7.

Extending across the bottom of the pallet 1, when the panels 2 are assembled, are a plurality of skid rails or plates 11 of cross-sectional flanged U-shape. These skid rails 11 are secured to the bottoms 7, extending across the junctures or adjacent surfaces of the interconnected end members 9 and 10 by suitable bolts or fastening means indicated at 12 and provided with inclined end closure inserts 13 forming an inclined continuation of the inclined surface 4a of the nose rail 4, best seen in FIG. 4. These skid rails 11 not only form the skid bearing surfaces for the pallet where ejected and dropped from a low-flying aircraft, but also maintain the adjacent top edges of the sides of the panel level at all times, even during a skid on uneven ground.

The elongated extruded truss webbed panels 2 each have extruded complemental vertical tongue-and-groove interlocking portions along their opposite sides as seen in FIGS. 4 to 7, comprising an upwardly extending tongue member 14, projecting from and extending along the bottom portion of one longitudinal edge, and a downwardly facing channel or groove 15, also extruded with the panel, and extending along the bottom portion of the other side of each panel.

The upper longitudinal side or edge portions of the panels are each extruded with similar thickened abutment lugs or projections, indicated at 16 and 17.

In the extrusion, an excess thickness of metal, indicated at 14a in FIG. 6, is left on the abutment side of the tongue member 14, while the sides of the downwardly extending groove or channel is also left with an excess metal thickness, indicated at 15a.

In like manner, and during the extrusion of the panels, the upper abutment surfaces or lugs 16 and 17 are also left with excess thickness of metal, indicated at 16a and 17a in FIG. 5.

When the platforms or pallets 1 are dropped, all high adverse bending forces transmitted to the platform upon ground contact tend to cause the platform to concave upwardly and only the concave upward forces have to be accounted for. The side rails 3 and skids 11 provide sufficient strength to resist concave forces during normal handling and air transport. The interlocking engagement between the complemental vertical tongue-and-groove portions 14 and 15 on the lower edges retain the adjacent bottom edges of the panels against separation upon upward forces tending to bend the adjacent panels angularly upward and the abutment member surfaces 16, 17 resist this upward angular deflection of the adjacent panels. The skid rails 11, extending longitudinally across the bottom of the pallet, assist in resisting this deflection and also maintain the adjacent panels from relative vertical movement. The side rails 3 also resist any relative "concave" or angular movement between the adjacent panels.

A two-headed machining tool of conventional design can easily be used that incorporates the desired panel width between the cutting heads to simultaneously trim off the excess material 15a, 16a and 17a. These fixed cutting heads allow a very economical and simultaneous machining of the excess metal 16a, 17a, 14a and 15a (FIG. 6) from the tongue-and-groove structure 16 and 17, thereby allowing or holding very close tolerances while permitting a high-volume production rate. In other words, this extruded interlocking panel design provides for the excess metal 14a, 16a and 15a, 17a to be extruded with each of the basic panels and during the machining process this excess material is removed to a very close tolerance.

Referring to FIGS. 6, 7 and 8, the ends of the extruded panels 2 are machined, preferably with a double-wheel milling cutter to provide grooves 18 for the reception of the flanges 19 on the end closure plates 20. The end closure plates 20, 23 are secured in place in the ends of the panels 2 by rivets 21.

The outer surfaces of the end closure plates 20 are milled, as at 22, to interlockingly receive the main side rails 3, which are held in position by the bolts 23.

The top or cargo-receiving surface of the pallet is provided with conventional "cargo" tiedown rings 24 mounted in suitable cups 25 that are recessed into the top surface 6, as seen in FIGS. 1 and 9. Also the side rails 3 are provided with the usual lugs 26 to provide locking recesses for the cargo aircraft latch retainer means. A suitable bridle 27 is secured to each of the side rails 3 for connection to the pallet-withdrawing means such as a retraction parachute to pull the pallet out of the aircraft.

The extruded pallets 1 are preferably made of lightweight metallic material such as aluminum alloy and when machined and the end closure plates 20 are secured in the ends of the panels they are easily assembled by interengaging the tongue-and-groove elements 14 and 15, securing the skid rails to the lower pallet structure across the junctures. This maintains the interlocking engagement, while the abutment surfaces 16 and 17 resist angular upward movement between the panels. The skid rails 4, which extend the length of the pallets, also assist in resisting this angular movement between the panels during handling.

The interlock 22 between each of the end closure members 20 and the elongated side rails 3 also assist in stiffening the pallet structure against bending and distortion during loading, handling and dropping, following extrusion of the loaded pallets from a low-flying aircraft.

For purposes of exemplification, a particular embodiment of the invention has been shown and described to the best understanding thereof. However, it will be apparent that changes and modifications in the arrangement and construction of the parts thereof may be resorted to without departing from the true spirit and scope of the invention as defined in the accompanying claims.

I claim:

1. An assembled aircraft cargo delivery pallet comprising; a plurality of identical elongated rectangular panel members; complementary interengaging coupling means formed on the opposite bottom longitudinal edges of each of said panel members for connecting the said bottom longitudinal edges of the panel members together against separation; identical abutment means formed on the opposite upper longitudinal edge portions of said panel members for abutting engagement therebetween for resisting upward angular movement between adjacent panel members in said pallet around said coupling means; a plurality of elongated skid rails extending transversely across the bottom surfaces of said panel members between the opposite ends of said pallet; means rigidly securing said skid rails to the bottom of said pallet adjacent said interengaging coupling means; and elongated side rails rigidly secured to the opposite ends of the panel members, extending between the opposite longitudinal ends of said pallet, for resisting relative longitudinal and vertical movements between said panel members, when said pallet is withdrawn and dropped to the ground from a low-flying cargo aircraft; each of said panel members comprising extruded hollow lightweight metallic material having spaced parallel top and bottom surfaces, and spaced perpendicular side portions formed with internal truss web brace members therebetween; said complementary interengaging coupling means comprising an extruded upwardly extending tongue member formed along the lower edge portion of one side of each panel member and a complementary upwardly extending longitudinal groove formed in the bottom portion of the other side of each panel member, and identical longitudinal abutment members extruded with the panel members and projecting outwardly from the top edge portions of both of the side edges of the panel members.

2. An assembled aircraft cargo delivery pallet as in claim 1, in which said truss web brace members are extruded with the panel members and further extend within the panel members in uniform zigzag relation between the top and bottom panel surfaces from one longitudinal side of the panel members to the opposite side thereof; said complementary interengaging coupling means comprises a vertical upstanding longitudinal tongue located adjacent to the lower surface of each of the panel members in offset spaced relation from the panel member sidewall to leave an upwardly extending longitudinal channel between said tongue and the adjacent side of each of the panel members; said tongue-receiving groove in the bottom portion of the other side of each panel member extends upwardly above the bottom of the panel member in predetermined inwardly spaced relation from the adjacent side of the panel member to receive the tongue member therein, and includes a downwardly extending longitudinally interlocking rib dimensioned to fit between the upwardly extending tongue member and the adjacent side of each of the panel members.

3. An assembled aircraft cargo delivery pallet as in claim 2, in which each of said elongated extruded panel members includes end closure plates secured in the opposite ends of each of the panel members and extending between the opposite sides of the said panel members, and further including interengaging means between said elongated side rails and said closure plates; and means for rigidly securing said side rails to said end closure plates in said interengaging relation.